United States Patent [19]

Horiuchi et al.

[11] Patent Number: 4,896,734

[45] Date of Patent: Jan. 30, 1990

[54] SUPERCHARGED MOTOR VEHICLE

[75] Inventors: Kenji Horiuchi; Toru Ichinose, both of Shizuoka, Japan

[73] Assignee: Yamaha Hatsudoki Kabushiki Kaisha, Iwata, Japan

[21] Appl. No.: 314,240

[22] Filed: Feb. 21, 1989

Related U.S. Application Data

[63] Continuation of Ser. No. 839,682, Mar. 14, 1986, abandoned.

[30] Foreign Application Priority Data

Mar. 27, 1985 [JP] Japan .................................. 60-60800

[51] Int. Cl.[4] .............................................. B60K 13/02

[52] U.S. Cl. .................................................. 180/68.3

[58] Field of Search ..................... 180/68.1, 68.2, 86.3, 180/68.4, 297; 123/528, 559 R; 60/605 R

[56] References Cited

U.S. PATENT DOCUMENTS 4,485,882 12/1984 Ide et al. ............................ 180/297

4,533,012 8/1985 Komoda ............................ 180/68.3

FOREIGN PATENT DOCUMENTS 56-167817 12/1981 Japan .

0183523 11/1982 Japan .................................. 123/559

*Primary Examiner*—Charles A. Marmor

*Assistant Examiner*—Richard Camby

*Attorney, Agent, or Firm*—Ernest A. Beutler

[57] ABSTRACT

Several embodiments of motor vehicles having transversely disposed supercharged engines. In each embodiment, the supercharger is positioned at one end of the engine so as to receive a source of unobstructed cooling air flow into the engine compartment. In each embodiment, the supercharger is driven directly from the engine but at the end opposite to which the normal accessories are driven. In some embodiments, the supercharger is driven from the engine flywheel and in other embodiments, it is driven either from one end of a camshaft or by means of an externally positioned shaft driven from the accessory end. In certain embodiments, the radiator is positioned in an offset relationship so that the supercharger does not receive air that is heated by the radiator and a baffle is provided for precluding against the transmission of heat to the supercharger.

29 Claims, 5 Drawing Sheets

Fig-3
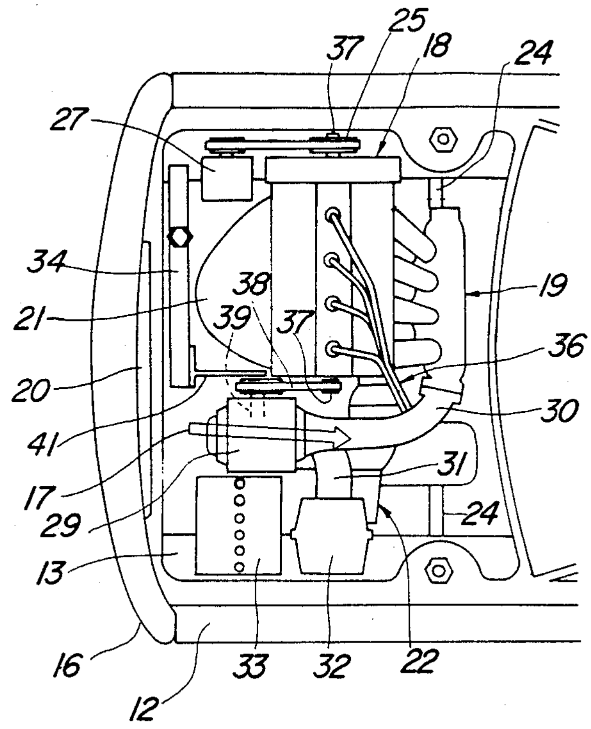
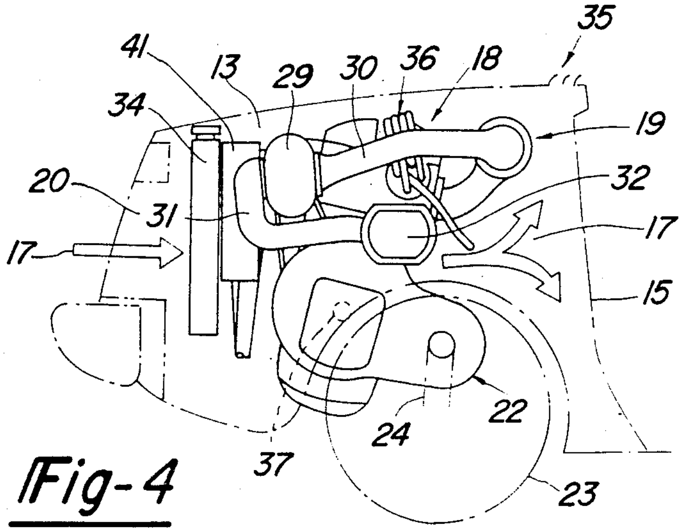
Fig-4

Fig-9
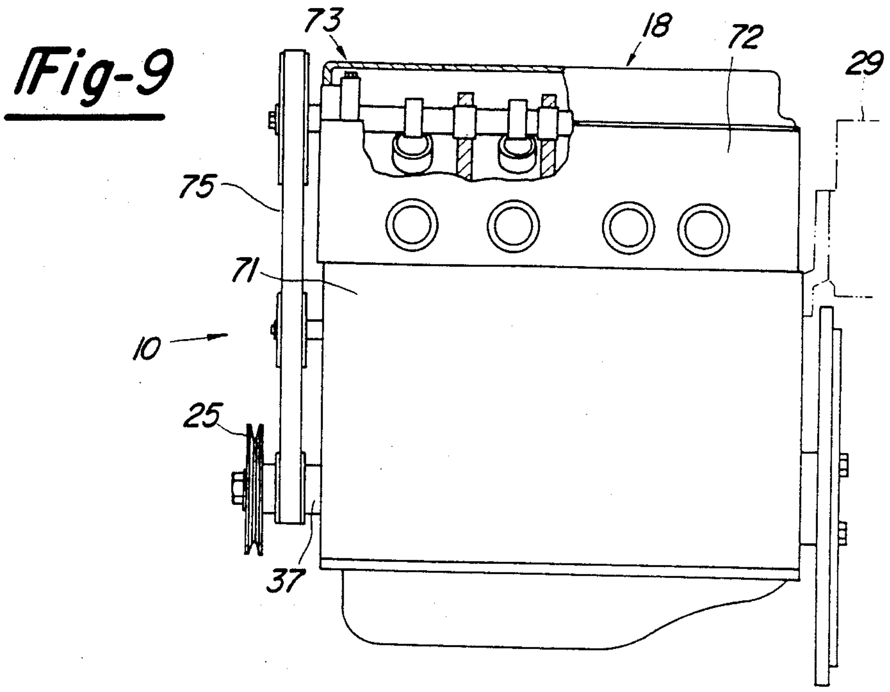
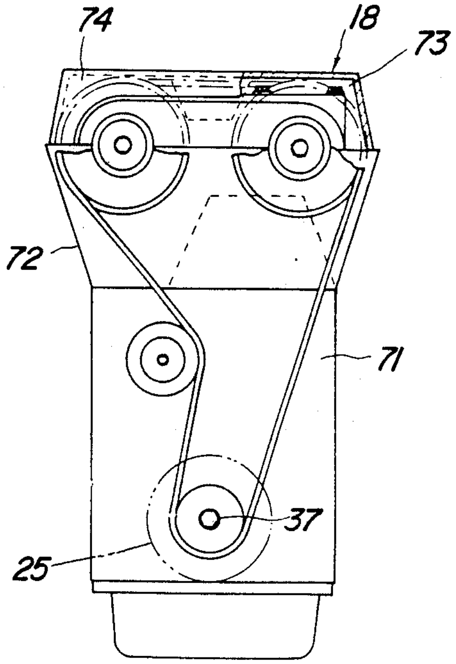
Fig-10

SUPERCHARGED MOTOR VEHICLE

This is a continuation of U.S. patent application Ser. No. 839,682, filed Mar. 14, 1986 abandoned.

BACKGROUND OF THE INVENTION

This invention relates to a supercharged motor vehicle and more particularly to an improved drive arrangement and placement for a supercharged automotive engine.

Recently, superchargers have enjoyed considerable popularity as a means for increasing the power output of an internal combustion engine without increasing its displacement. Such devices are particularly useful in this end but do present some problems. For example, the fact that the supercharger pressurizes the inlet charge causes the inlet charge temperature to increase and if the amount of temperature increase is not controlled, the net gain of supercharging may very well be lost. This is a particular problem in conjunction with modern motor vehicles wherein the engine compartment is quite compact and it is difficult to position the supercharger in an area where it can be adequately cooled. These problems are particularly difficult in conjunction with vehicles having transverse engine placement such as front wheel drive cars embodying transverse engines or rear wheel drive cars embodying such engines.

It is, therefore, a principal object of this invention to provide an improved drive arrangement for a supercharged motor vehicle wherein the supercharger is positioned where it will be cooled.

It is a further object of this invention to provide an improved motor vehicle construction wherein the engine compartment contains an engine and a supercharger and the supercharger is positioned so that it will receive a good supply of cool fresh air.

It is yet another object of this invention to provide an improved engine compartment arrangement for a motor vehicle wherein the supercharger of the engine is positioned wherein the engine proper will not obstruct the flow of cooling air to the engine.

SUMMARY OF THE INVENTION

This invention is adapted to be embodied in a motor vehicle having an engine compartment, an air inlet to the engine compartment for delivering cooling air thereto and an engine disposed in the engine compartment with its output shaft rotatable about an axis extending generally perpendicularly to the direction of air flow into the engine compartment from the air inlet. A supercharge is provided for delivering air under pressure to the induction system of the engine. In accordance with the invention, the supercharger is offset to one end of the engine and is disposed in a path of air flow from the air inlet that is not obstructed by the engine.

BRIEF DESCRIPTION OF THE DRAWINGS

FIG. 3 is a top plan view, in part similar to FIG. 1, showing a second embodiment of the invention.

FIG. 4 is a side elevational view, in part similar to FIG. 2, showing the construction of the embodiment of FIG. 3.

FIG. 9 is a side elevational view, with a portion broken away, showing the construction of the engine associated with each embodiment.

FIG. 10 is a side elevational view of the engine looking in the direction of the arrow 10 in FIG. 9.

DETAILED DESCRIPTION OF THE PREFERRED EMBODIMENTS

Figure 1:
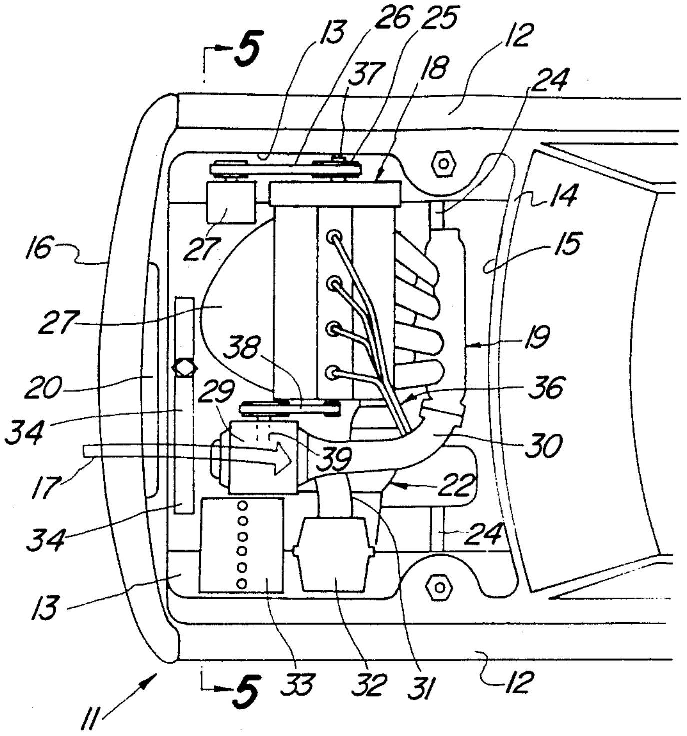
FIG. 1 is a top plan view of a portion of a motor vehicle constructed in accordance with a first embodiment of the invention and shows particularly the engine compartment with the hood removed.
Figure 2:
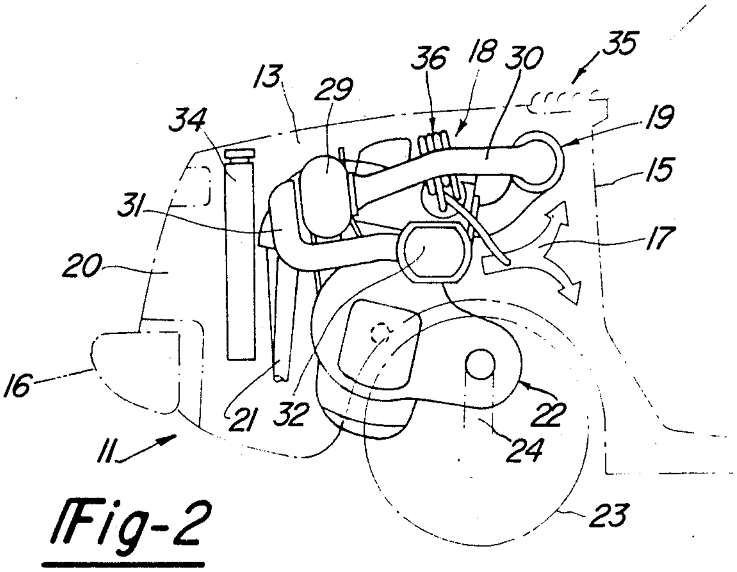
FIG. 2 is a side elevational view showing the layout of the components within the engine compartment. The body portions of the vehicle are shown in phantom.
Figure 5:
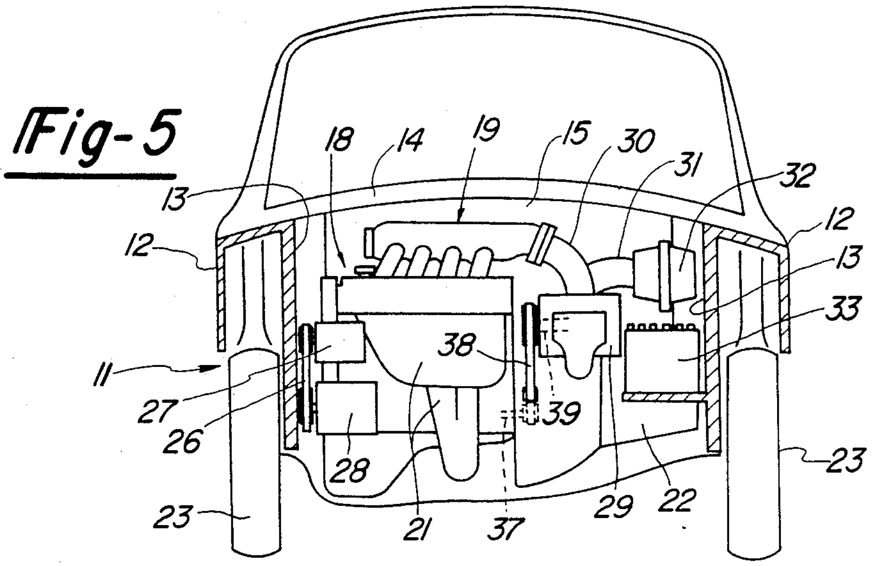
FIG. 5 is a cross-sectional view taken along the line 5—5 of FIG 1. This figure also would be a cross-section taken along the same plane of FIG. 3.

Referring first to the embodiment of FIGS. 1, 2 and 5, a motor vehicle constructed in accordance with this embodiment of this invention is identified generally by the reference numeral 11. The motor vehicle 11, in the illustrated embodiment, is of the front engine, front wheel drive type. In addition, as will become apparent, the engine is disposed with its rotational axis extending transverse to the longitudinal center line of the vehicle 11. It is to be understood, however, that certain facets of the invention may be utilized in conjunction with rear wheel driven cars, rear engine rear wheel driven cars and cars having engines disposed in other than a transverse relationship.

The motor vehicle 11 includes a pair of front fenders 12 having fender aprons 13 which define in part an engine compartment. In addition, a cowling 14 separates this engine compartment from the passenger compartment and includes a firewall 15. A front bumper 16 is positioned forwardly of the front fenders 12 and is disposed contiguous to a grill opening 20 which permits cooling air to be delivered to the engine compartment in a direction indicated by the arrow 17. The construction of the motor vehicle as thus far described is convention and, for that reason, details of the various components of the body are not believed to be necessary to understand the invention.

An engine, indicated generally by the reference numeral 18 and having a general construction as shown in FIGS. 9 and 10, is positioned within the engine compartment and is disposed so that its output shaft (to be described) rotates about an axis that extends transversely to the longitudinal center line of the vehicle and transversely to the air flow direction 17. The engine 18 is depicted as being of the inline type, although certain facets of the invention may be used with engines having other configurations such as V type engines. The engine 18 is provided with an induction system that includes an intake manifold 19 that is positioned on the firewall side of the engine 18. In addition, an exhaust system which includes an exhaust manifold 21 is positioned on the air inlet side of the engine 18.

The engine output shaft drives a clutch and transmission assembly 22 that is positioned at one end of the engine 18. The transmission assembly 22, in turn, drives a pair of front wheels 23 by means of a differential and axle shafts 24. The front wheels 23 are contained within the front fenders 12.

A number of accessories may be driven from the engine and these are normally driven from the end opposite to that which drives the transmission 22. For this purpose, one or more pulleys 25 may be connected to the engine output shaft and drive a plurality of belts 26 for driving such accessories. These accessories may include a generator or alternator 27 and an air conditioning compressor or power steering pump 28. In addition, any other known types of engine driven accessories may be driven from the engine output shaft via belts 26 at the one end of the engine.

In accordance with a feature of the invention, a supercharger, indicated generally by the reference numeral 29, is positioned at the opposite end of the engine. In this way, the supercharger 29 can be driven positively from the engine output shaft without interfering with the other accessory drives. In addition, the positioning of the supercharger 29 at one end of the engine will insure that the flow of cooling air from the engine compartment air inlet in the direction of the arrow 17 will pass directly across the supercharger 29 without having been obstructed or heated by the engine 18.

The supercharger 29 may be of any known type such as a positive displacement type of compressor or a centrifugal compressor. The discharge from the supercharger 29 is delivered through an outlet pipe 30 to an inlet of the intake manifold 19 so as to pressurize the inlet air delivered to the manifold 19. A source of cool outside air is delivered to the supercharger 29 through an inlet conduit 31 from an air cleaner and air silencer 32. It should be noted that the air cleaner and air silencer 32 is also positioned remotely from the engine and in the path of air flow 17 so that it will receive a source of cool unobstructed inlet air.

The air cleaner and silencer 32 is positioned within the engine compartment behind a battery 33. Positioned adjacent the battery 33 and extending across the grill opening 20 is a cooling radiator 34 for the engine 18. The air flowing through the pattern 17 will pass across the radiator 34, the supercharger 29 and be expelled as shown in FIG. 2 downwardly and upwardly through a cowl positioned vent 35.

The engine 18 is also provided with an ignition system that includes spark plug wires 36 and a suitable spark control mechanism (not shown).

The supercharger 29 is driven from an engine output shaft 37 by means of a belt 38 that is trained around the flywheel and which is positioned at the opposite end of the engine from the belt 26 that drives the other engine driven accessories. For this purpose, the belt 38 cooperates with a pulley formed on an input shaft 39 of the supercharger 29.

In the embodiment of FIGS. 1 and 2, the supercharger 29 was positioned rearwardly of the radiator 34. Hence, there will be some heat from the radiator 34 that will heat the cooling air that is delivered to the supercharger 29. FIGS. 3 and 4 show another embodiment wherein this heating is also avoided. In the embodiment of FIGS. 3 and 4, the basic components are the same, except as hereinafter noted, and for that reason, they have been identified by the same reference numerals.

In this embodiment, the radiator 34 is displaced transversely in the engine compartment so that it lies directly in front of the engine 18 and is offset to one side of the grill opening 20. Hence, the radiator 34 is not positioned so that it will intersect the path of air flow 17 across the supercharger 29 and further cooling will be provided. In addition, a heat baffle 41 is affixed to one side of the radiator 20 and extends vertically so as to shield the exhaust manifold 27 and also so as to preclude against air from the radiator 34 flowing across the side of the supercharger 29.

Figure 6:
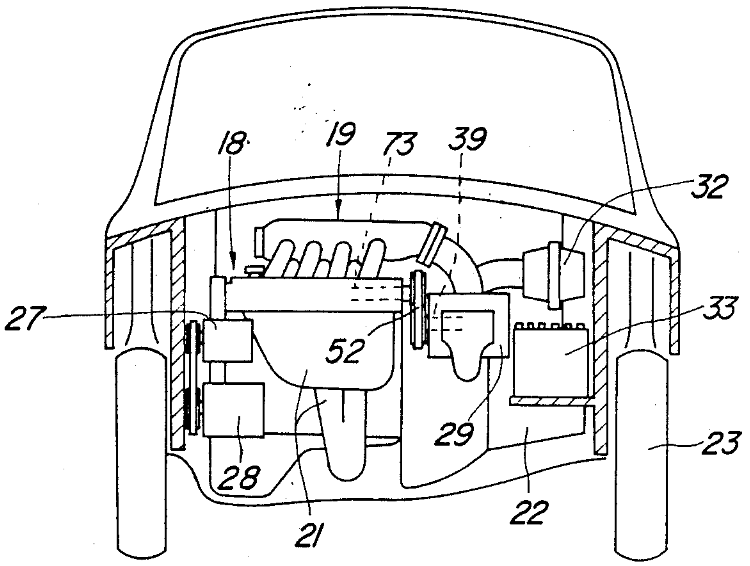
FIG. 6 is a cross-sectional view, in part similar to FIG. 5, and shows a third embodiment of the invention and is taken generally along the line 6—6 of FIG. 7.
Figure 7:
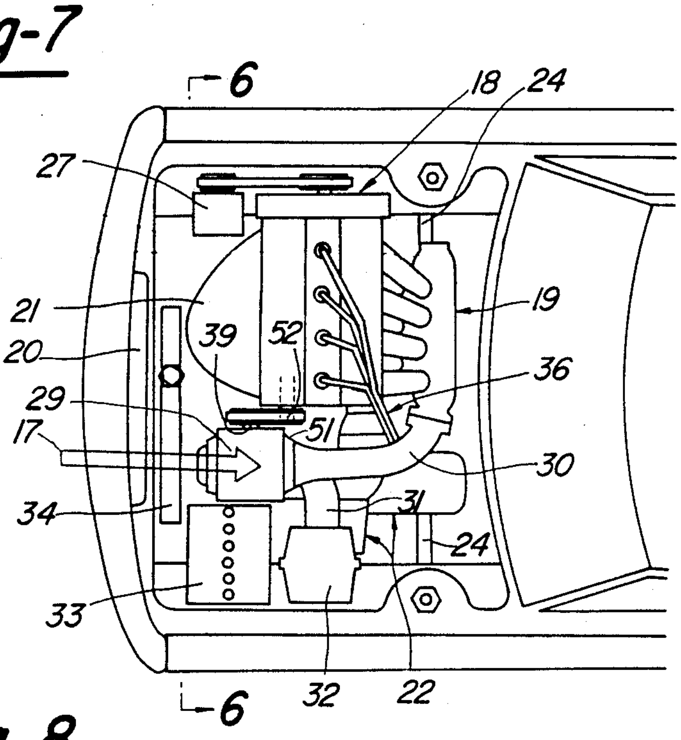
FIG. 7 is a top plan view of the third embodiment.

In the two embodiments of the invention as thus far described, the supercharger has been driven directly from the engine output shaft. Although it is desirable to drive the supercharger at the opposite end of the engine from the other accessory drives, this can be done in other ways than by driving the supercharger from the engine output shaft. FIGS. 6 and 7 shows another embodiment for driving the supercharger. This embodiment is, in other respects, similar to the embodiment of FIGS. 1, 2 and 5 and, for that reason, components which are the same have been identified by the same reference numeral and will not be described again in detail.

In this embodiment, one of the engine overhead driven camshafts, which will be described in more detail later, is provided with a driving sprocket 51 on the flywheel end which drives a belt 52. The belt 52, in turn, drives a sprocket that is affixed to the driving shaft 39 of the supercharger 29. In this way, the supercharger 29 is driven from the end opposite to the accessory driving end. In all other regards, this embodiment is the same as those previously described.

Figure 8:
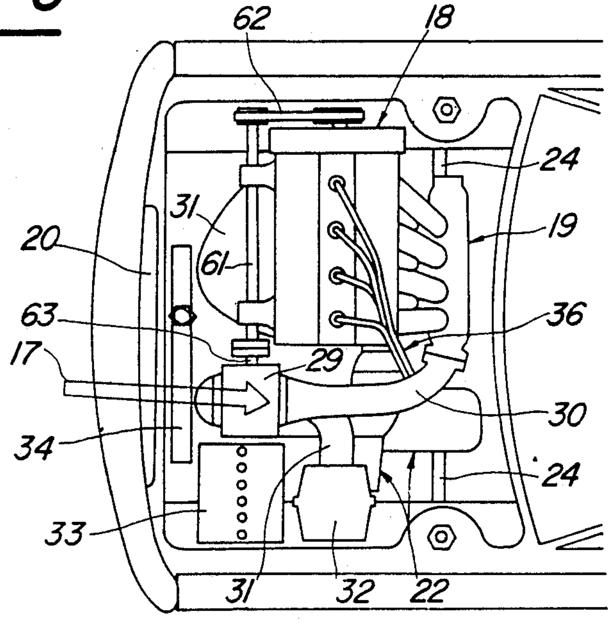
FIG. 8 is a top plan view, in part similar to FIGS. 1, 3 and 7, of a fourth embodiment.

FIG. 8 shows a fourth embodiment of the invention which differs only from the embodiment of FIG. 7 in the manner in which the supercharger is driven. For that reason, components which are the same as the previously described embodiment have been identified by the same reference numerals.

In this embodiment, a shaft 61 is positioned externally of the engine 18 on its exhaust side. The shaft 61 is driven at its forward end by means of a belt 62 that is driven suitably from the engine at the accessory drive side. The shaft 61 is coupled, at its other side, by means of a coupling 63 to the driving shaft of the supercharger 29 for driving it. Thus, it is unnecessary with this embodiment to provide any driving pulleys at the transmission side of the engine, however, the supercharger 29 is still positioned at this side of the engine and thus in the path of cool air flow 17.

FIGS. 9 and 10 show the basic construction of the engine 18 as employed in the various embodiments described. The engine 18 includes a cylinder block 71 in which the cylinder bores are formed. Supported above the cylinder block 71 in a known manner is a cylinder head 72 that carries an exhaust camshaft 73 and an intake camshaft 74. The camshafts 73 and 74 are driven in timed relation to the engine output shaft 37 by means of a timing belt 75 that is trained over a pulley formed on the exposed end of the engine output shaft 37 and corresponding pulleys carried by the exhaust camshaft and intake camshaft. Therefore, it should be readily apparent that the basic engine construction is conventional and, for this reason, a further discussion and description of it is believed to be unnecessary.

It should be readily apparent from the foregoing description that a number of embodiments of the invention have been illustrated and described and in each of which the engine is provided with a supercharger that is driven by the engine but which is located in such a way that it will receive a supply of cool air that has not been heated by the engine and which is not obstructed. Thus, volumetric efficiency can be significanly improved while at the same time convenient packaging is achieved.

Although the invention has been described in conjunction with preferred embodiments, it is to be understood that various changes and modifications may be made without departing from the spirit and scope of the invention, as defined by the appended claims.

We claim:

1. In a motor vehicle having an engine compartment, an air inlet to said engine compartment for delivering cooling air thereto, an engine disposed in said engine compartment with its output shaft rotating about an axis extending generally perpendicular to the direction of air flow into said engine compartment from said air inlet and the ends of said engine being contiguous to the ends of said output shaft, and a supercharger for delivering air under pressure to an induction system of said engine, the improvement comprising said supercharger lying outside of the area defined by a pair of parallel planes extending in the direction of air flow and each containing a respective end of said engine and disposed in a path of air flow from said air inlet not obstructed by said engine and so that air flowing around the outer periphery of said supercharger does not intersect said engine.

2. In a motor vehicle as set forth in claim 1 wherein the supercharger is driven from the engine.

3. In a motor vehicle as set forth in claim 2 wherein the supercharger is driven mechanically from an engine shaft.

4. In a motor vehicle having an engine compartment, an air inlet to said engine compartment for delivering cooling air thereto, an engine disposed in said engine compartment with its output shaft rotating about an axis extending generally perpendicular to the direction of air flow into said engine compartment from said air inlet, a supercharger for delivering air under pressure to an induction system of said engine and mechanically driven from an engine shaft at one end of said engine, the improvement comprising said supercharger being offset from said one end of said engine and disposed in a path of air flow from said air inlet not obstructed by said engine, and a plurality of other accessories driven by said engine at the end opposite to said one end.

5. In a motor vehicle as set forth in claim 4 wherein the supercharger is driven from an engine flywheel.

6. In a motor vehicle as set forth in claim 4 wherein the engine has at least one camshaft and the supercharger is driven from the camshaft.

7. In a motor vehicle as set forth in claim 4 wherein the supercharger is driven from an externally positioned shaft that extends along one side of the engine and which is driven from the accessory end of the engine.

8. In a motor vehicle as set forth in claim 1 further including a radiator for dissipating heat from the engine and disposed in the path of air flow within the engine compartment.

9. In a motor vehicle as set forth in claim 8 wherein the radiator is offset relative to the supercharger so that air heated by the radiator does not flow to the supercharger.

10. In a motor vehicle having an engine compartment, an air inlet to said engine compartment for delivering cooling air thereto, an engine disposed in said engine compartment with its output shaft rotating about an axis extending generally perpendicular to the direction of air flow into said engine compartment from said air inlet, a radiator in said engine compartment in the path of air flow for dissipating heat from said engine, and a supercharge for delivering air under pressure to an induction system of said engine, the improvement comprising said supercharger being offset to one end of said engine and disposed in a path of air flow from said air inlet not obstructed by said engine, said radiator being offset from said supercharger so that the air heated by said radiator does not flow to said supercharger, and baffle means disposed between the radiator and the supercharger for precluding the flow of heat to the supercharger.

11. In a motor vehicle as set forth in claim 10 wherein the engine has an exhaust system disposed between the radiator and the engine and the baffle is disposed between the exhaust system and the supercharger for precluding the transfer of heat to the supercharger from the exhaust system.

12. In a motor vehicle as set forth in claim 1 wherein the supercharger is provided with an air inlet which is spaced away from the engine relative to the supercharger.

13. In a motor vehicle as set forth in claim 1 wherein the engine compartment is positioned in the front of the motor vehicle.

14. In a motor vehicle as set forth in claim 13 further including a radiator for dissipating heat from the engine and disposed in the path of air flow within the engine compartment.

15. In a motor vehicle as set forth in claim 14 wherein the radiator is offset relative to the supercharger so that air heated by the radiator does not flow to the supercharger.

16. In a motor vehicle as set forth in claim 15 further including baffle means disposed between the radiator and the supercharger for precluding the flow of heat to the supercharger.

17. In a motor vehicle as set forth in claim 16 wherein the engine has an exhaust system disposed between the radiator and the engine and the baffle is disposed between the exhaust system and the supercharger for precluding the transfer of heat to the supercharger from the exhaust system.

18. In a motor vehicle as set forth in claim 13 wherein the engine drives the front wheels.

19. In a motor vehicle as set forth in claim 18 wherein the engine has a plurality of cylinders aligned relative to the perpendicular direction.

20. In a motor vehicle as set forth in claim 19 wherein the supercharger is driven at one end of the engine and a plurality of accessories are driven at the other end of the engine.

21. In a motor vehicle as set forth in claim 20 wherein the supercharger is driven from the engine flywheel.

22. In a motor vehicle as set forth in claim 20 wherein the engine has at least one camshaft and the supercharger is driven from the camshaft.

23. In a motor vehicle as set forth in claim 20 wherein the supercharger is driven from an externally positioned shaft that extends along one side of the engine and which is driven from the accessory end of the engine.

24. In a motor vehicle as set forth in claim 4 wherein the engine compartment is positioned in the front of the motor vehicle.

25. In a motor vehicle as set forth in claim 24 wherein the engine drives the front wheels.

26. In a motor vehicle as set forth in claim 25 wherein the engine has a plurality of cylinders aligned relative to the perpendicular direction.

27. In a motor vehicle as set forth in claim 5 wherein the engine compartment is positioned in front of the motor vehicle.

28. In a motor vehicle as set forth in claim 27 wherein the engine drives the front wheels.

29. In a motor vehicle as set forth in claim 28 wherein the engine has a plurality of cylinders aligned relative to the perpendicular direction.

* * * * *

UNITED STATES PATENT AND TRADEMARK OFFICE
CERTIFICATE OF CORRECTION

PATENT NO. : 4,896,734

DATED : January 30, 1990

INVENTOR(S) : Kenji Horiuchi; Toru Ichonose

It is certified that error appears in the above-identified patent and that said Letters Patent is hereby corrected as shown below:

On the title page, "29 Claims," should read --31 Claims--.

Col. 8, after line 5 insert Claims 30 and 31.

30. In a motor vehicle as set forth in Claim 10 wherein the engine compartment is positioned in the front of the motor vehicle.

31. In a motor vehicle as set forth in Claim 11 wherein the engine compartment is positioned in the front of the motor vehicle.

Signed and Sealed this

Fourteenth Day of July, 1992

*Attest:*

DOUGLAS B. COMER

*Attesting Officer*

*Acting Commissioner of Patents and Trademarks*